US009283860B2

(12) United States Patent
Estevez Irizar et al.

(10) Patent No.: US 9,283,860 B2
(45) Date of Patent: Mar. 15, 2016

(54) ELECTRICAL CHARGING SYSTEM FOR ENERGY ACCUMULATORS OF RAILWAY VEHICLES

(75) Inventors: Pedro Estevez Irizar, Hernani (ES); Aitor Gastanares Etxezarreta, Urretxu (ES); Jose Manuel Nicolas Silva, Mollet (ES); Victor Vigil Varela, Rubi (ES)

(73) Assignee: CONSTRUCCIONES Y AUXILIAR DE FERROCARRILES, S.A., Beasain (Gipuzkoa) (ES)

( * ) Notice: Subject to any disclaimer, the term of this patent is extended or adjusted under 35 U.S.C. 154(b) by 217 days.

(21) Appl. No.: 14/006,441

(22) PCT Filed: Mar. 20, 2012

(86) PCT No.: PCT/ES2012/000064
§ 371 (c)(1),
(2), (4) Date: Sep. 20, 2013

(87) PCT Pub. No.: WO2012/127077
PCT Pub. Date: Sep. 27, 2012

(65) Prior Publication Data
US 2014/0009115 A1    Jan. 9, 2014

(30) Foreign Application Priority Data
Mar. 22, 2011  (ES) .................................. 201100328

(51) Int. Cl.
*B60L 5/38* (2006.01)
*B60L 11/18* (2006.01)
*B60M 1/36* (2006.01)
*B61L 3/12* (2006.01)
*B61L 25/02* (2006.01)

(52) U.S. Cl.
CPC ............... *B60L 11/1824* (2013.01); *B60L 5/38* (2013.01); *B60M 1/36* (2013.01); *B61L 3/125* (2013.01); *B61L 25/025* (2013.01); *B60L 2200/26* (2013.01)

(58) Field of Classification Search
CPC ......................................................... B60L 5/38
USPC ......................................................... 320/109
See application file for complete search history.

(56) References Cited

U.S. PATENT DOCUMENTS

| 2002/0121991 | A1  | 9/2002 | Rostren |
| 2003/0105560 | A1  | 6/2003 | Sugita et al. |
| 2006/0005736 | A1* | 1/2006 | Kumar ........................... 105/1.4 |

FOREIGN PATENT DOCUMENTS

| EP | 2014505 A1 | 1/2009 |
| FR | 2640570    | 6/1990 |

* cited by examiner

*Primary Examiner* — Thuan Do
(74) *Attorney, Agent, or Firm* — Lucas & Mercanti, LLP

(57) ABSTRACT

The invention relates to an electrical charging system for energy accumulators or railway vehicles, comprising position-finding means (A1, A2, A3, A4) of a vehicle (1), at least one electrical energy capturing element (2), identification and positioning means (R1, R2, R3, R4, R5, R6) for identifying and positioning the vehicle (1), and at least one electrical changing zone (Z1, Z2, Z3, Z4), such that by means of associating the identification and positioning means (R1, R2, R3, R4, R5, R6) with respective position-finding means (A1, A2, A3, A4), the presence and configuration of the vehicle (1) is determined, and an area covered by said vehicle (1) corresponding with the electrical charging zones (Z1, Z2, Z3,Z4) to be electrified is defined.

12 Claims, 4 Drawing Sheets

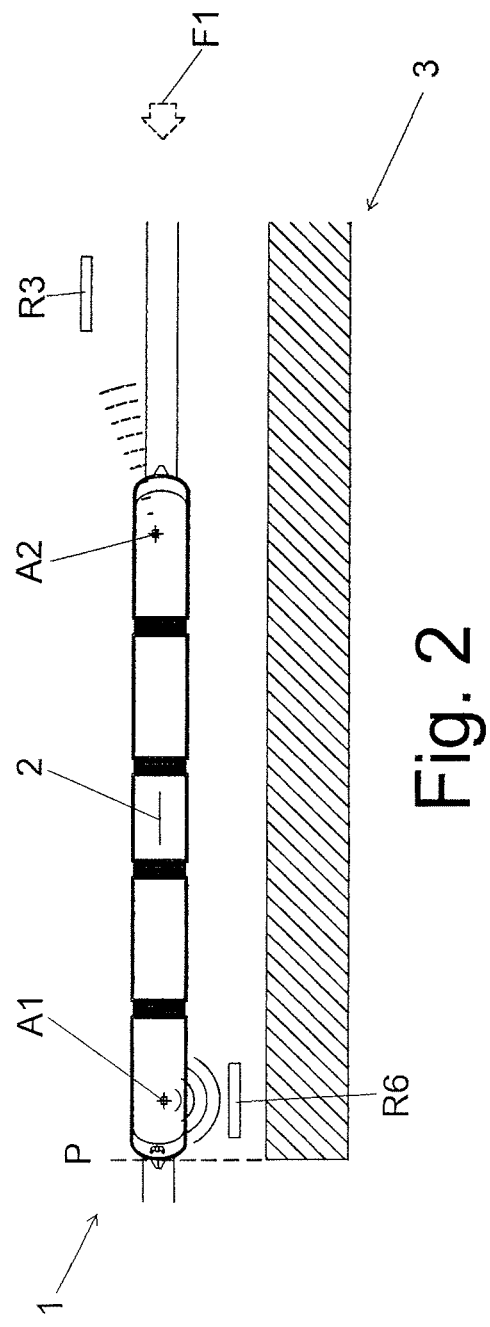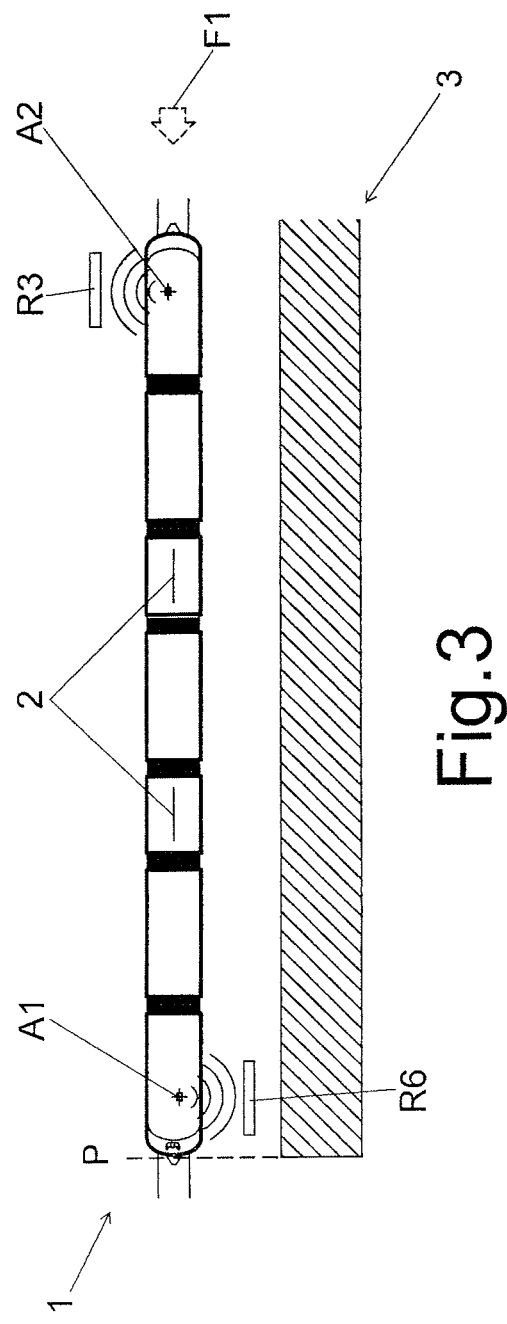

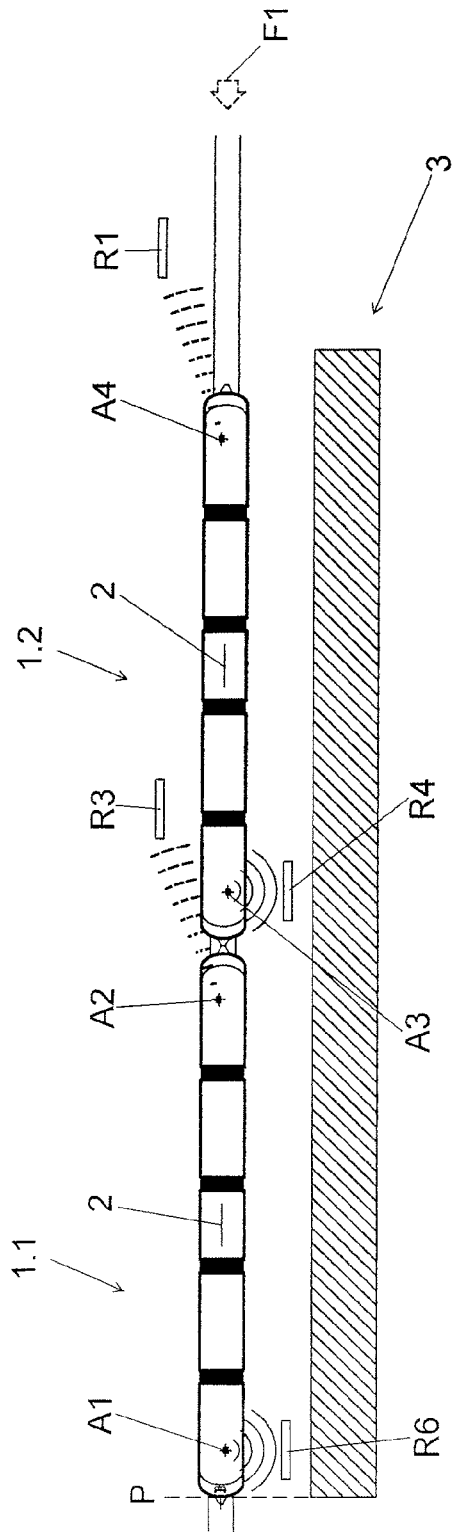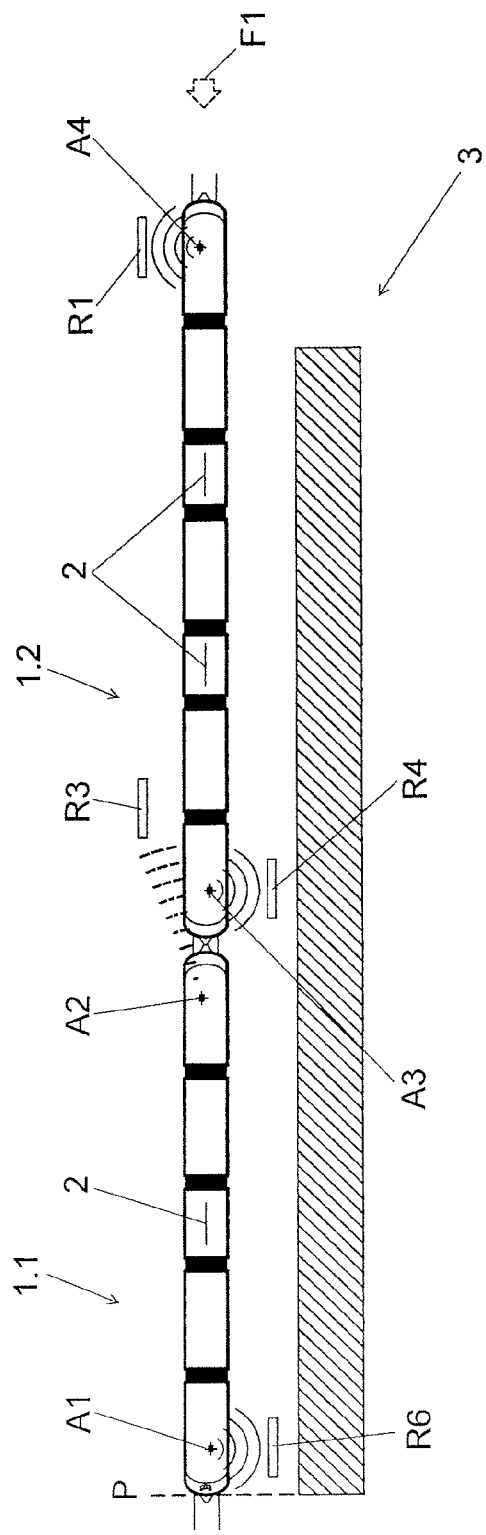

ELECTRICAL CHARGING SYSTEM FOR ENERGY ACCUMULATORS OF RAILWAY VEHICLES

CROSS-REFERENCE TO RELATED APPLICATIONS

This application is a 371 of PCT/ES2012/000064 filed Mar. 20, 2012, which in turn claims the priority of ES P201100328/8 filed Mar. 22, 2011, the priority of both applications hereby claimed and both applications are incorporated by reference herein.

FIELD OF THE ART

The present invention relates to installations for supplying power to railway vehicle drive equipment, proposing a system which allows recharging energy accumulators oil railway vehicles, such as tramways, subways or trains, in a reliable and safe manner.

STATE OF THE ART

In the search for a sustainable future, transportation-related carbon emission reduction has resulted in electrical propulsion becoming one of the most efficient solutions to drive means of public transportation, as in the case of railway vehicles such as tramways, trains, subways, or another type of vehicles such as buses, etc.

Usually, in the case of city or intercity electrified transportation such as tramways, the drive equipment is powered by means of an articulated system of rods which is located on the roof of the tramway, which draws current by contacting with an overhead line called a catenary. These overhead lines are becoming less and less acceptable in cities due to the visual impact they generate on the environment, besides the high economic cost in the infrastructure involved in the use thereof.

Various solutions nave been developed to eliminate tramway catenary, one of them consisting of powering the tramway through a third rail located on the ground between the guide rails. Said third rail is segmented into small sections which are independently powered, such that only those sections which are covered by the passage of the tramway have electric current, whereby possible electrocution accidents with the third rail are prevented. These systems can have direct contact between the tramway and the third rail or no contact, where electricity does not go through the third rail directly, but rather goes through same in a form converted by means of a magnetic field.

These solutions require establishing a continuous connection with the third rail, which causes an increase in the structure installation and maintenance costs, in addition to requiring complicated systems for isolating the third rail and the seed for synchronizing the electrification of the third rail with the passage of the tramway.

A solution which allows eliminating the catenary and which does nor require a continuous power supply connection is capacitor- and battery-based energy accumulators. This equipment, which comprises several energy storage modules interconnected to one another powering the drive equipment and the auxiliary systems of the tramway, is usually arranged on the roof of the tramway and partially recharged by means or the kinetic energy recovered when braking.

However, the energy recovered when braking is not sufficient when the tramway is required to travel long distances, in which case the energy accumulators must be completely recharged before the tramway sets out, so it is necessary to provide a system which allows recharging the energy accumulators in a safe and reliable manner in the stop zones of the tramway.

OBJECT OF THE INVENTION

The present invention proposes a system which allows recharging energy accumulators onboard a railway vehicle in a safe and reliable manner.

The electrical charging system for energy accumulators of railway vehicles object of the invention comprise equipment onboard the vehicle, said equipment being formed by:
 position-finding means of the vehicle;
 and at least one electrical energy capturing element associated with at least one energy accumulator of the vehicle;
and track elements located on the ground in the station stops of the vehicle, which are formed by:
 identification and positioning means for identifying and positioning the vehicle associated with the position-finding means onboard the vehicle;
 and at least one electrical charging zone associated with the electrical energy capturing element onboard the vehicle.

Therefore, by means of the association of at least two of the identification and positioning means with respective position-finding means, the presence and configuration of the vehicle is determined, and an area covered by said vehicle corresponding with the electrical charging zones which can be safely electrified is defined.

In other words, by means of a ground-vehicle-ground communication between the onboard equipment and the track elements, the safe electrification of the electrical charging zones located in the station stop of the vehicle is controlled, such that no order can be given for electrifying any charging zone which is not covered by the vehicle, possible electrocution accidents thus being prevented.

The identification and positioning means of the track elements comprise signal emitting-receiving beacons located in the track, whereby the position and the configuration of the railway vehicle in the station stop is identified, whereas the position-finding means of the equipment onboard the vehicle are signal emitting-receiving antennas which are located in the front left part and in the rear right part of the vehicle, for example, even though this condition is non-limiting, said means being able to be located at otter different points of the vehicle without this altering the concept of the invention, such as the fact that said antennas may be located in a centered position of the railway vehicle. The system is also valid with one-way communication between the vehicle and the ground, where the identification and positioning means of the track elements comprise beacons that only receive signals and the position-finding means of the equipment onboard the vehicle are antennas that only emit the signal.

The track elements are only communicated with the onboard equipment when the vehicle moves or stops in a position in which an electromagnetic coupling occurs between the position-finding means onboard the vehicle and the identification and positioning means located on the ground. In other words, depending on the number of cars the railway vehicle has, the identification and positioning means have specific detection characteristics, a permanent detection that takes place when a continuous electromagnetic coupling is established between a position-finding means and its corresponding identification and positioning means, or a detection of passage that takes place when a periodic electromagnetic coupling is established between a position-finding means and its corresponding identification and positioning means.

On the other hand, it has been envisaged that the electrical energy capturing element of the onboard equipment is located in the lower part of the vehicle for being connected in a safe manner with a corresponding electrical charging zone, which comprises an electrical energy transmitting rail located in the tracks. However, and without altering the concept of the invention, the capturing element can be located at one end of the vehicle, or even in the upper part thereof where it is connected to a charging zone made up of an overhead catenary. In a preferred embodiment of the invention, the energy capturing element comprises an electrical energy capturing shoe.

A system is thus obtained which, due to its constructive and functional features, is preferably applied for the intended function in relation to charging the energy accumulators of railway vehicles in a safe and reliable manner. By means of the system of the invention, the presence of the vehicle can be detected in a safe manner, the configuration type thereof can be determined, and which or the electrical charging zones can be electrified is established.

DESCRIPTION OF THE DRAWINGS

FIG. 2 shows an embodiment of the system for the case of a five-car vehicle.

FIG. 3 shows another embodiment of the system of the invention for the case of a seven-car vehicle.

FIG. 4 shows another embodiment of the invention for the case of two five-car vehicles attached to one another.

FIG. 5 shows another embodiment of the invention for a first five-car vehicle attached to a second seven-car vehicle.

DETAILED DESCRIPTION OF THE INVENTION

Figure 1:
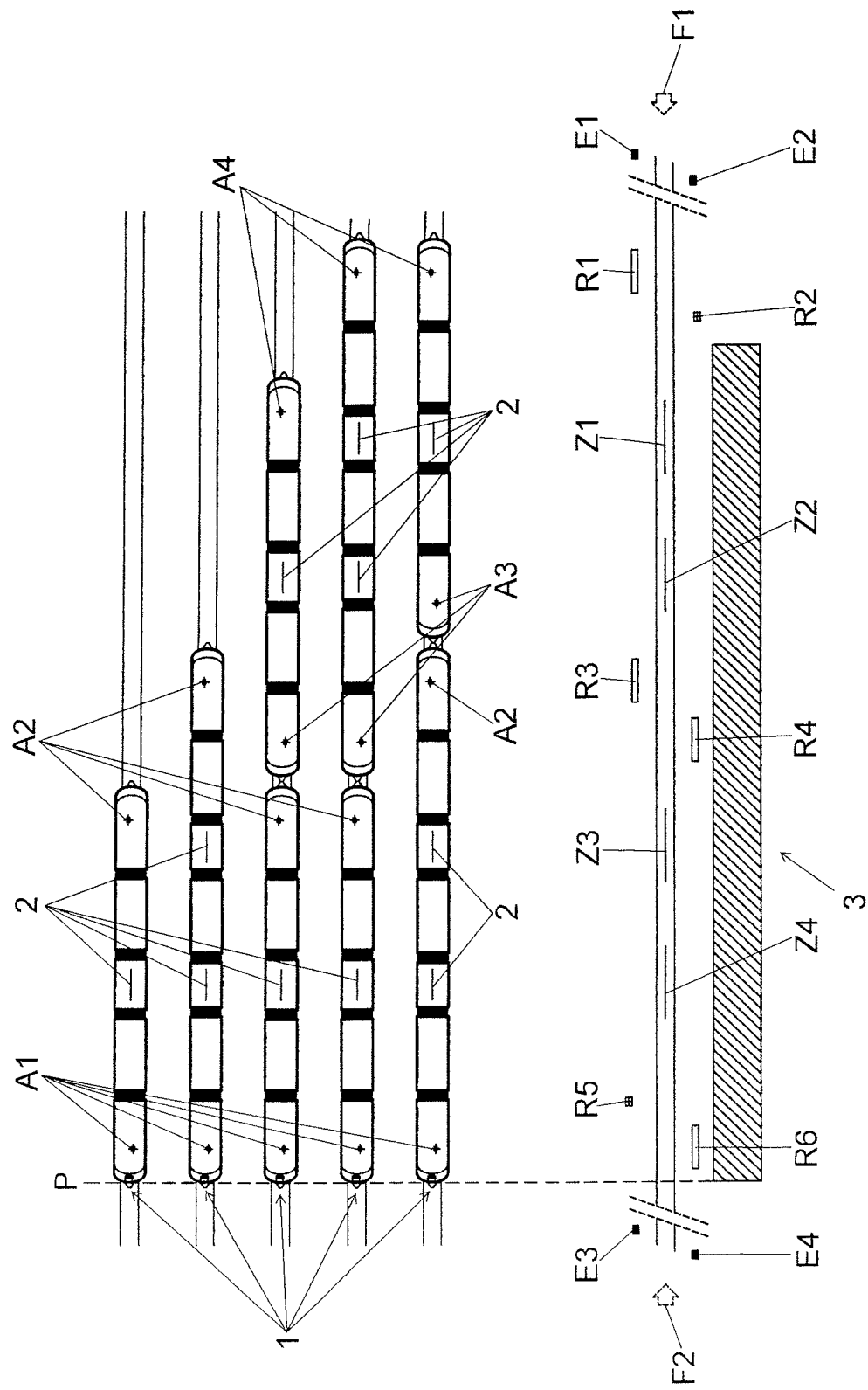
FIG. 1 shows a diagram of the electrical charging system for energy accumulators object, of the invention in relation to different types of railway vehicles.

FIG. 1 shows a diagram with all the elements forming the electrical charging system for energy accumulators of railway vehicles object of the invention, wherein equipment onboard each vehicle (1) and track elements located in a station stop (3) of the vehicle (1) can be seen.

By way of non-limiting example, said figure shows five railway vehicle (1) configuration types of those used in passenger transport service. Specifically, the configurations shown are a five-car vehicle, a seven-car vehicle, two five-car vehicles attached to one another, a five-car vehicle attached to a seven-car vehicle and a seven-car vehicle attached to a five-car vehicle.

Each vehicle (1) has onboard posit ion-finding means (A1, A2, A3, A4) for finding the position of the vehicle. According to one embodiment, a signal emitting-receiving antenna is arranged in the front, left part of each vehicle, whereas another signal emitting-receiving antenna is arranged in the rear right part, of each vehicle. Likewise, the five-car configuration has an electrical energy capturing element (2) which is associated with at least one energy accumulator (not depicted) of the vehicle (1) whereas in the seven-car configuration two energy capturing elements (2) which are associated with at least one energy accumulator of the vehicle (1) have been envisaged.

The track elements located on the ground in the station stop (3) are made up of identification and positioning means (R1, R2, R3, R4, R5, R6) for identifying and positioning the vehicle (1) which are associated with respective position-finding means (A1, A2, A3, A4) onboard the vehicle (1), and of electrical charging zones (Z1, Z2, Z3, Z4) associated with a respective electrical energy capturing element (2) onboard the vehicle (1), these zones (Z1, Z2, Z3, Z4) being made up of an electrical energy transmitting rail segment located between the tracks.

The identification and positioning means (R1, R2, R3, R4, R5, R6) of the track elements comprise signal emitting/receiving beacons located in the track, whereby the presence and configuration type of the vehicle (1) in the station stop (3) is identified. By means of using at least two of fiie identification and positioning means (R1, R2, R3, R4, R5, R6) the presence of the vehicle (1) is detected and the configuration type of the vehicle (1) in question is determined; also by using the identification and positioning means (R1, R2, R3, R4, R5, R6), an area with the electrical charging zones (Z1, Z2, Z3, Z4) which are covered by the vehicle (1) itself and which can therefore be electrified wittiest involving any safety risk, is identified.

It has been envisaged that the electrical energy capturing element (2) of the onboard equipment is located in the lower part of the vehicle (1) for being connected in a safe manner with a corresponding electrical charging zone (Z1, Z2, Z3, Z4). The capturing element (2) can be located at one end of the vehicle (1), or even in the upper part thereof, where it is connected with an overhead voltage line replacing the charging zones, without this altering the concept of the invention. According to one embodiment of the invention, the energy capturing element (2) is an electrical energy capturing shoe, though it may be another type of energy capturing element, such as an inductive system, for example.

Additionally, emitting beacons (E1, E2, E3, E4) the purpose of which comprises communicating to the vehicle the remaining distance to reach a stop zone (P) where it must stop, has been envisaged, to be arranged before and after the station stop (3). The beacon (E2) communicates with the position-finding means (A1) of the vehicle (1) when it runs in the normal direction of travel, indicated in the figure with the arrow (F1). When it runs in the direction contrary to the track, indicated with the arrow (F2), the beacon (E3) performs this function. The beacons (E3 and E4) are used to communicate to the vehicle (1) that it has completely pulled out of the station stop (3), this being carried out in the normal direction of travel, by means of communicating with the position-finding means (A2, A4) arranged in the rear part of the vehicle (1). When the vehicle (1) resumes its travel and pulls out of the stop point (P), the identification and positioning means (R1, R2, R3, R4, R5, R6) are no longer associated with the respective position-finding means (A1, A2, A3, A4), and therefore those electrical charging zones (Z1, Z2, Z3, Z4) which were electrified no longer have voltage since said relation has been terminated.

With this being the case, by way of non-limiting example FIGS. 2 to 6 depict the mode of ground-vehicle-ground communication between the onboard equipment and the track elements, and how the safe electrification of the charging zones (Z1, Z2, Z3, Z4) is carried out depending on the type of vehicle (1) that stops in the station stop (3). The communication between ground and vehicle can also be one-way, without this altering the concept of the invention, using only emitting devices in the equipment onboard the vehicle (1) and receiving devices in the track elements located on the ground.

It will be obvious for a person skilled in the art that, based on the examples described in FIGS. 2 to 6, the system object of the invention is scalable by means of adding or eliminating track elements, such that the system can be adapted to different vehicle (1) configurations. The operation of the system is described for the case of running in the normal direction of travel, indicated with the arrow (F1). In the case of running in the wrong direction, indicated with the arrow (F2), the system behaves in the same manner, i.e., the tail (rear part) of the vehicle (1) can act as the head (front part) of the vehicle or vice versa.

FIG. 2 shows an embodiment of the invention, for the simplest case of a five-car vehicle (1). As occurs for all types of vehicles (1), first the beacon (E1) contacts the position-finding means (A1) of the vehicle (1) and issues a warning for the vehicle to park at the stop point (P) at the level of the identification and positioning means (R6). In this case, when the identification and positioning means (R6) permanently detects the position-finding means (A1) and the identification and positioning means (R3) has detected the passage of the position-finding means (A2), the electrical charging zone (Z4) is electrified, and the energy capturing element (2) is coupled thereto for recharging the energy accumulator or accumulators of the vehicle (1). When the recharging has been completed, the element (2) is disconnected from the electrical charging tone (Z4) and the vehicle (1) pulls out of the station stop (3). When the identification and positioning means (R6) does not detect the position-finding means (A1), an order is given to stop electrifying the electrical charging zone (Z4). The confirmation that the vehicle has completely pulled out of the station (3) is performed by means of the communication of the position-finding means (A1, A2) with the beacons (E4, E3).

Permanent detection is established by means of a continuous electromagnetic coupling between the respective positron-finding means (A1-A4) of the vehicle (1) and the corresponding identification and positioning means (R1-R6) of the track. Detection of passage is established by means of a periodic electromagnetic coupling between the respective posit ion-finding means (A1-A4) of the vehicle (1) and the corresponding identification and positioning means (R1-R6) of the track.

FIG. 3 shows another embodiment of the invention for the case of a severe-car vehicle (1) with two energy capturing elements (2), Once the vehicle (1) has stopped in the stop point (P), the identification and positioning means (R6) permanently detects the position-finding means (A1) of the vehicle (1), and the identification and positioning means (R3) permanently detects the position-finding means (A2) of the vehicle (1). When these two conditions are met, the electrical charging zones (Z4 and Z3) are electrified, and the energy capturing elements (2) are lowered and coupled thereto for recharging the energy accumulator or accumulators of the vehicle (1). When the vehicle (1) resumes its travel and the identification and positioning means (R6) does not detect the position-finding means (A1) and the identification and positioning means (R3) does not detect the position-finding means (A2), an order is given to stop electrifying the electrical charging zones (Z4 and Z3) covered by the vehicle (1).

FIG. 4 shows another embodiment of the invention for the case of a first five-car vehicle (1.1) attached to a second five-car vehicle (1.2). In this case, once the first vehicle (1.1) has stooped at the stop point (P), an order is given to electrify the zones (Z4, Z2), to that end the conditions that the identification and positioning means (R6) permanently detects the position-finding means (A1) of the first vehicle (1.1), the identification and positioning means (R3) has detected the passage of the position-finding means (A2) of the first vehicle (1.1), the identification and positioning means (R4) permanently detects the position-finding means (A3) of the second vehicle (1.2), and the identification and positioning means (R1) has detected the passage of the position-finding means (A4) of the second vehicle (1.2), must be met. When the vehicles (1.1 and 1.2) resume their travel and the identification and positioning means (R6) does not detect the position-finding means (A1), an order is given to stop electrifying the electrical charging zone (Z4) covered by the first vehicle (1.1), and when the identification and positioning means (R4) does not detect the position-finding means (A3), an order is given to stop electrifying the electrical charging zone (Z2) covered by the second vehicle (1.2).

FIG. 5 shows another embodiment oil the invention tor the case of a first five-car vehicle (1.1) attached to a second seven-car vehicle (1.2). In this case, once the first vehicle (1.1) has stopped at the stop point (P), an order is given to electrify the zones (Z4, Z2, Z1), to that end the conditions that the identification and positioning means (R6) permanently detects the position-finding means (A1) of the first vehicle (1.1), the identification and positioning means (R3) has detected the passage of the position-finding means (A2) of the first vehicle (1.1), the identification and positioning means (R4) permanently detects the position-finding means (A3) of the second vehicle (1.2), and the identification and positioning means (R1) permanently detects the position-finding means (A4) of the second vehicle (1.2), must be met. When the vehicles (1.1 and 1.2) resume their travel and the identification and positioning means (R6) does not detect the position-finding means (A1), an order is given to stop electrifying the electrical charging zone (Z4) covered by the first vehicle (1.1), and when the identification and positioning means (R4) does not detect the position-finding means (A3) and the identification and positioning means (R1) does not detect the position-finding means (A4), an order is given to stop electrifying the electrical charging zones (Z2 and Z1) covered by the second vehicle (1.2).

Figure 6:
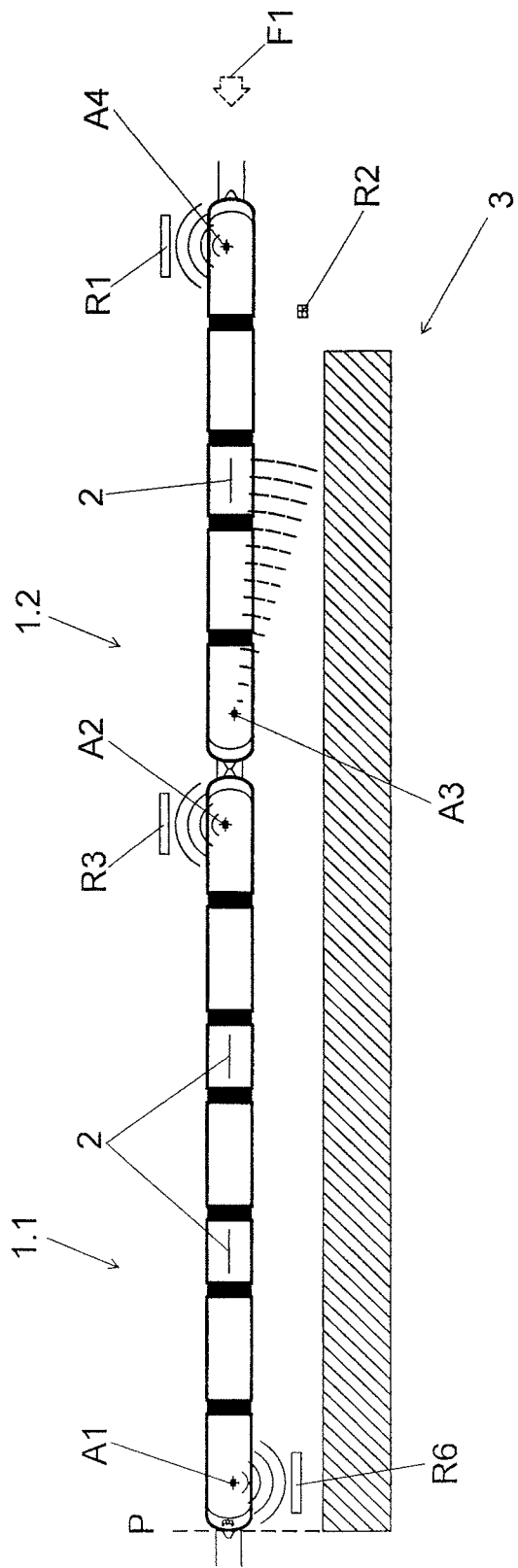
FIG. 6 shows another embodiment of the invention for the case or a first seven-car vehicle attached to a second five-car vehicle.

FIG. 6 shows another embodiment of the invention for the case of a first seven-car vehicle (1.1) attached to a second five-car vehicle (1.2). In this case, once the first vehicle (1.1) has stopped at the stop point (P), an order is given to electrify the zones (Z4, Z3, Z1), to that end the conditions that the identification and positioning means (R6) permanently detects the position-finding means (A1) of the first vehicle (1.1), the identification and positioning means (R3) permanently detects the position-finding means (A2) of the first vehicle (1.1), and the identification and positioning means (R1) permanently detects the position-finding means (A4) of the second vehicle (1.2), must be met. Additionally, it is necessary to have identification and positioning means (R2) detecting that the passage of the position-finding means (A3) of the second vehicle (1.2) has occurred. In the event of running in the wrong direction, the means which would be used for this purpose would be the identification and positioning means (R5) of the general diagram of FIG. 1, When the vehicles (1.1 and 1.2) resume their travel and the identification and positioning means (R6) does not detect the position-finding means (A1) and the identification and positioning means (R3) does not detect the position-finding means (A2), an order is given to stop electrifying the electrical charging zones (Z4, Z3) covered by the first vehicle (1.1), and when the identification and positioning means (R1) does not detect the position-finding means (A4), an order is given to stop electrifying the electrical charging zone (Z1) covered by the second vehicle (1.2).

The invention claimed is:

1. An electrical charging system for energy accumulators of railway vehicles, comprising:
   an equipment onboard a vehicle, said equipment comprising:
      a plurality of communication devices, wherein a first communication device is disposed in a front portion of the vehicle and a second communication device is disposed in a rear of the vehicle; and
      at least one electrical energy capturing element associated with at least one energy accumulator of the vehicle; and
   a plurality of track elements located on the ground in a station stop of the vehicle, said plurality of track elements comprising:
      a plurality of identification and detecting means for identifying and detecting a presence of the vehicle associated with the plurality of communication devices; and
      at least one electrical charging zone associated with the electrical energy capturing element onboard the vehicle;
   wherein in response to a detection by a first identification and detecting means of a first communication device and a detection by a second identification and detecting means of a second communication device, the presence and configuration of the vehicle is determined and the electrical charging zones corresponding to an area covered by said vehicle are electrified, and wherein electrification of the electrical charging zones corresponding to the area covered by said vehicle is stopped in response to a failure by the first identification and detecting means to detect the first communication device and by the second identification and detecting means to detect the second communication device.

2. The electrical charging system for energy accumulators of railway vehicles according to claim 1, wherein at least one of the identification and detecting means comprises a beacon permanently detecting a corresponding communication device.

3. The electrical charging system for energy accumulators of railway vehicles according to claim 1, wherein the identification and detecting means comprise beacons periodically detecting the passage of a corresponding communication device.

4. The electrical charging system for energy accumulators of railway vehicles according to claim 1, wherein the identification and detecting means for identifying and detecting the vehicle comprise signal emitting-receiving beacons establishing two-way communication with respective communication devices the communication devices being signal emitting-receiving antennas.

5. The electrical charging system for energy accumulators of railway vehicles according to claim 1, wherein the identification and detecting means for identifying and detecting the vehicle comprise signal receiving beacons establishing one-way communication with respective communication devices the communication devices being signal emitting antennas.

6. The electrical charging system for energy accumulators of railway vehicles according to claim 1, wherein the energy capturing element comprises an energy capturing shoe.

7. The electrical charging system for energy accumulators of railway vehicles according to claim 1, wherein a first identification and detecting means is a first beacon permanently detecting a first communication device of the vehicle, and a second identification and positioning means is a second beacon periodically detecting a passage of a second communication device of the vehicle.

8. The electrical charging system for energy accumulators of railway vehicles according to claim 1, wherein a first identification and detecting means is a first beacon permanently detecting a first communication device of the vehicle and a second identification and positioning means is a second beacon permanently detecting a second communication device of the vehicle.

9. The electrical charging system for energy accumulators of railway vehicles according to claim 1, wherein a first identification and detecting means is a first beacon permanently detecting a first communication device of a first vehicle, a second identification and detecting means is a second beacon periodically detecting a passage of a second communication device of the first vehicle, a third identification and detecting means is a third beacon permanently detecting a third communication device of a second vehicle, and a fourth identification and detecting means is a fourth beacon periodically detecting a passage of a fourth communication device of the second vehicle.

10. The electrical charging system for energy accumulators of railway vehicles according to claim 1, wherein the identification and detecting means is a first beacon permanently detecting a first communication device of a first vehicle, a second identification and detecting means is a second beacon periodically detecting a passage of a second communication device of the first vehicle, a third identification and detecting means is a third beacon permanently detecting a third communication device of a second vehicle, and a fourth identification and detecting means is a fourth beacon permanently detecting a fourth communication device of the second vehicle.

11. The electrical charging system for energy accumulators of railway vehicles according to claim 1, wherein a first identification and detecting means is a first beacon permanently detecting a first communication device of a first vehicle, a second identification and detecting means is a second beacon permanently detecting the position-finding means a second communication device of the first vehicle, a third identification and detecting means is a third beacon periodically detecting a passage of a third communication device of a second vehicle, and a fourth identification and detecting means is a fourth beacon permanently detecting a fourth communication device of the second vehicle.

12. The electrical charging system for energy accumulators of railway vehicles according to claim 1, wherein first emitting beacons indicating to the vehicle a distance to a stop point are arranged before the station stop, and second emitting beacons indicating to the vehicle that it has pulled out of the station stop are arranged after the station stop.

* * * * *